Aug. 7, 1928.
A. C. HAYDEN
1,679,572
PUNCH FOR CUTTING NOTCHES IN FILM REELS
Filed July 21, 1927  2 Sheets-Sheet 1
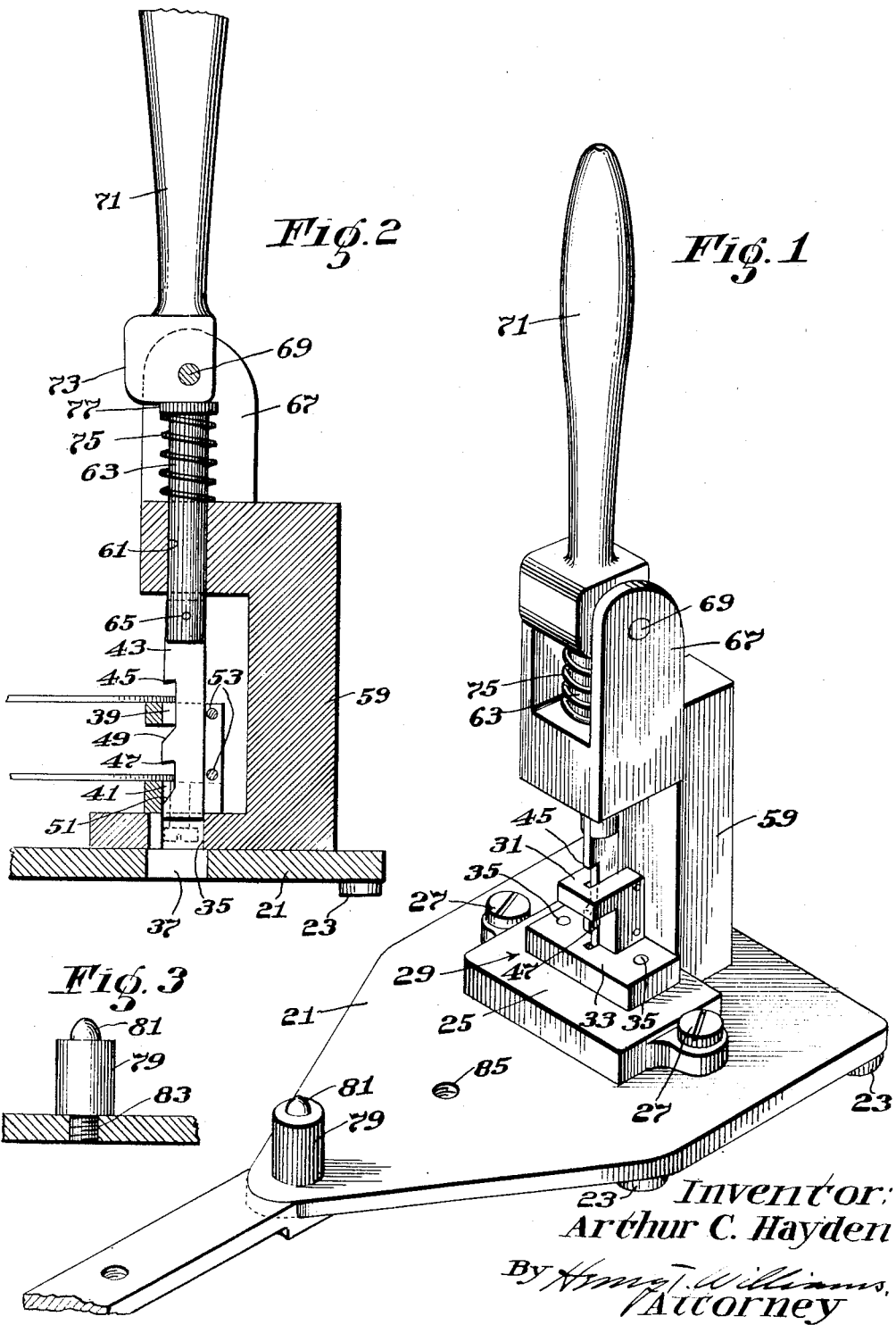
Inventor:
Arthur C. Hayden
By Hurry T. Williams,
Attorney Aug. 7, 1928.
A. C. HAYDEN
1,679,572
PUNCH FOR CUTTING NOTCHES IN FILM REELS
Filed July 21, 1927     2 Sheets-Sheet 2
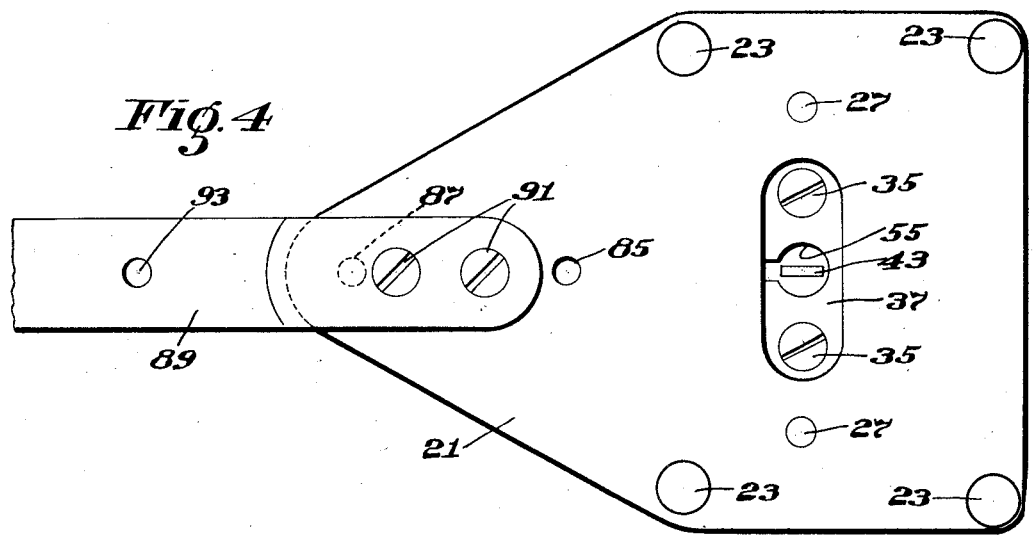
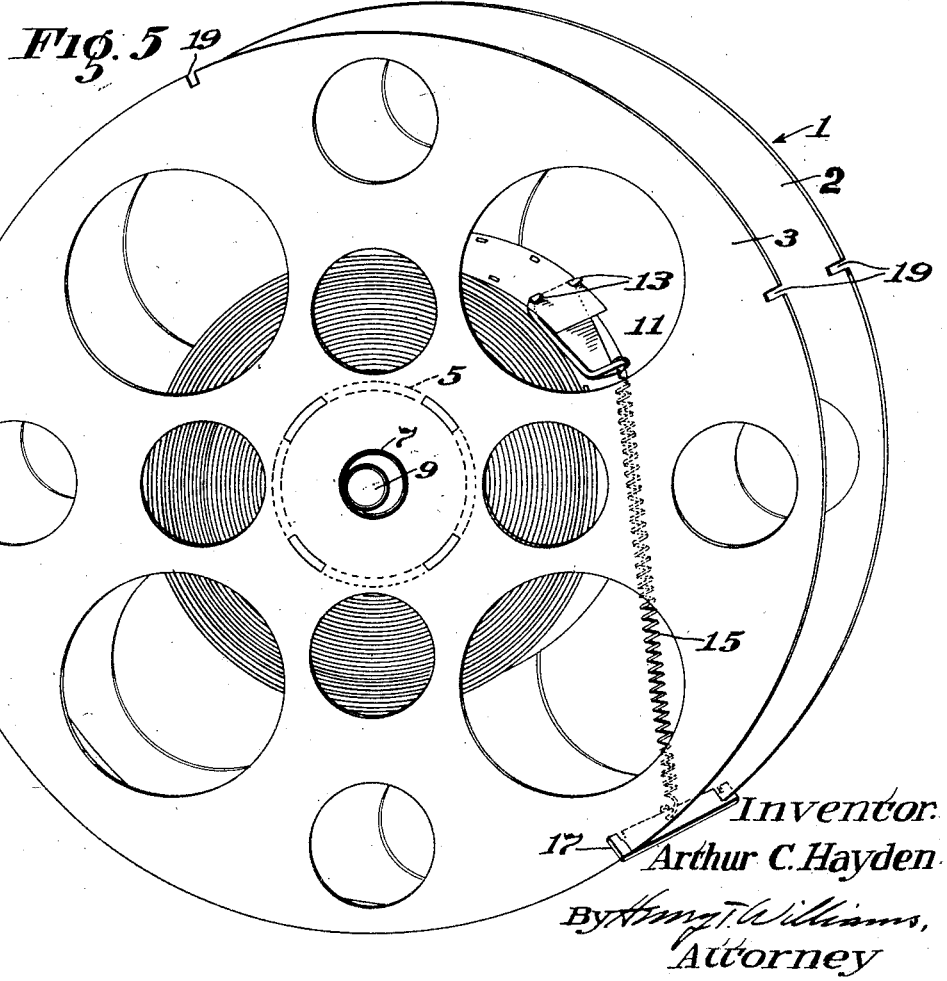
Inventor
Arthur C. Hayden
By Henry T. Williams,
Attorney Patented Aug. 7, 1928.

1,679,572

UNITED STATES PATENT OFFICE.

ARTHUR C. HAYDEN, OF BROCKTON, MASSACHUSETTS.

PUNCH FOR CUTTING NOTCHES IN FILM REELS.

Application filed July 21, 1927. Serial No. 207,333.

The invention to be hereinafter described relates to punches, and more particularly to a punch for cutting peripheral notches in film reels for motion picture apparatus.

When the reels are not in use, it is desirable to provide means for holding the free ends of the film to the reels, in order that they may not project outward beyond the reels and be liable to become torn and injured in handling.

In my copending application Serial No. 191,049, filed May 13, 1927, is disclosed a desirable holding means for this purpose, and comprises a member having a pair of prongs adapted for insertion in a pair of holes of the series of holes which are near the edges of the film reel. This member is connected by a coil spring to a bar which is adapted for insertion in any one of several pairs of peripheral notches in the reel plates. The construction is such that the free end portion of the film reel is held taut, while permitting expansion and contraction of the film.

The usual film reels do not have peripheral notches therein, but by the use of the punch to be described, notches may be quickly, easily and properly punched in the reel plates, thereby adapting the reel for application of the holding device thereto.

The character of the invention may be best understood by reference to the following description of one good form thereof shown in the accompanying drawings, wherein:

Fig. 1 is a perspective view of the punch shown herein as embodying the invention;

Fig. 2 is a vertical section through a portion of the punch;

Fig. 3 is a sectional detail showing the stud for centering the reel with relation to the punch;

Fig. 4 is a view of the under side of the base of the punch, and shows an extension device for application to the base; and Fig. 5 is a perspective view of a film reel and the device for holding the free end of the film to the reel.

Referring to the drawings, 1 (Fig. 5) designates a film reel comprising a pair of circular plates 2 and 3 connected by a hub 5, one of said plates having a central hole 7, and the other of said plates having a cup-shaped recess 9. The hole and recess are adapted to receive a spindle of the motion picture apparatus.

The device for holding the free end of the film to the reel comprises a plate 11 having a pair of prongs 13 adapted for insertion in a pair of holes of the usual two series of holes adjacent the edges of the film. The plate is connected by a coil spring 15 to a bar 17 which may be inserted in any selected pair among several pairs of peripheral notches 17 in the plates.

Next will be described the punch for cutting the notches 19 in the reel plates. This punch, in the present instance, comprises a base or support 21 (Figs. 1, 2 and 4) having buttons 23 at the bottom thereof. A plate 25 is secured on the base by screws 27. On the plate is a member 29 formed to provide an upper anvil 31 and a lower anvil 33, said member being secured to the plate by a pair of screws 35 which are entered up through an elongated opening 37 (Fig. 4) in the base.

The anvils have slots 39 and 41 therein opening at the rear of the anvils. Slidable in said slots is a bar 43 having a die 45 for cooperation with the upper anvil 31, and a die 47 for cooperation with the lower anvil 33. Intermediate the dies is an inclined portion 49, and beneath the lower die is an inclined portion 51 for deflecting slugs died from the plates, as will be described. A pair of pins 53 in the anvil member assist in guiding the die bar. Registering with the slots in the anvil member is a hole 55 in the plate 25, and communicating with said hole is the elongated hole 37, referred to, in the base.

Rising from the base is an upright 59 which conveniently may be formed integral with the plate 25. This upright has a bore 61 therein receiving a plunger 63 having a kerf in the lower end thereof into which the upper end of the die bar projects and is held by a pivot pin 65. Rising from the upright 59 is a fork 67 provided with a pin 69 on which a handle 71 is pivotally mounted. An end of the handle is formed to provide a cam 73 for engagement with the upper end of the plunger, the latter being urged upwardly into engagement with the cam by a coil spring 75 which encircles the plunger and is confined between the upper end of the upright and a flange 77 on the plunger.

Means is provided for centering the reel with relation to the dies, and in the present instance comprises a stud 79 having a nose 81 at the upper end thereof and a screw pin 83 at the lower end thereof, the latter being adapted to be screwed into either of a pair of holes 85 and 87 in the base according to the diameter of the reel to be centered with relation to the dies.

If larger reels are to have peripheral notches cut therein, an extension bar 89 (Figs. 1 and 4) may be provided, said bar being secured to the base by a pair of screws 91. This bar may have one or more holes 93 therein threaded to receive the screw pin 83 on the stud.

In use, the reel is presented to the punch and the hole 7 in one of its plates is placed on the stud nose 81 which preferably is made smaller than the hole in order that the peripheries of the plates may be pushed closely against the die bar portions beneath the dies. The margins of the plates rest upon the anvils. When the handle is pulled down, it will depress the plunger and cause the dies to cooperate with the anvils and punch a notch in each of the plates simultaneously. The slug punched out by the upper die will be forced through the upper anvil slot and will be deflected outwardly by the inclined portion 49. The slug cut out by the lower die 47 will be forced down through the lower anvil slot and ejected through the holes 55 and 37. After the notches have been cut the handle is rocked upwardly, thereby allowing the spring 75 to move the plunger and die bar upward in readiness for the next notch punching operation.

Motion picture apparatus is constructed to receive reels of different diameters, and it will be understood that the centering stud 79 is applied to the proper hole in the base or extension bar to enable centering of the selected reel with relation to the dies.

It will be understood that the invention is not limited to the specific embodiment shown, and that various deviations may be made therefrom without departing from the spirit and scope of the appended claims.

What is claimed is:

1. A punch for cutting peripheral notches in plates of a film reel, comprising a support, a pair of anvils on the support having slots therein and adapted to have peripheral portions of the plates rest thereon, a bar slidable in said slots having a pair of dies, and means for moving the bar to cause the dies to cooperate with the anvils and punch peripheral notches in the plates.

2. A punch for cutting peripheral notches in plates of a film reel, comprising a support, a pair of anvils on the support having slots therein and adapted to have peripheral portions of the plates rest thereon, a bar slidable in said slots having a pair of dies adapted to cooperate with the anvils and punch peripheral notches in the plates, said bar having a deflecting portion between the dies to discharge slugs punched out by one of the dies.

3. A punch for cutting peripheral notches in plates of a film reel, comprising a support, a pair of anvils on the support having slots therein and adapted to have peripheral portions of the plate rest thereon, and a bar slidable in said slots and having a pair of dies cooperating with the anvils to punch peripheral notches in the plates, said bar having provision for discharging from the anvils slugs punched from the plates by the dies.

4. A punch for cutting peripheral notches in plates of a film reel, comprising a base, a pair of anvils thereon, an upright on the base, a plunger slidable in the upright, a bar connected to the plunger and having a pair of dies for punching peripheral slots in reel plates on the anvils, and means for sliding the plunger and bar up and down.

5. A punch for cutting peripheral notches in plates of a film reel, comprising a base, an upright on the base, a pair of anvils on the base having slots therein, a bar slidable in the slots having a pair of dies cooperating with the anvils to cut peripheral notches in the plates, a handle pivotally mounted on the upright having a cam for moving the plunger and bar downward, and a spring for moving the plunger upward.

6. A punch for cutting peripheral notches in plates of a film reel, comprising a support, a pair of anvils on the support having slots therein and adapted to have peripheral portions of the plate rest thereon, a bar slidable in said slots having a pair of dies adapted to cooperate with the anvils to punch peripheral notches in the plates, and means on the support to center the reel with relation to the dies.

7. A punch for cutting peripheral notches in plates of a film reel, comprising a support, a pair of anvils on the support having slots therein and adapted to have peripheral portions of the plate rest thereon, a bar slidable in said slots having a pair of dies adapted to cooperate with the anvils to punch peripheral notches in the plates, and means to center reels of different diameters with relation to the dies.

8. A punch for cutting peripheral notches in plates of a film reel, comprising a support, a pair of anvils on the support having slots therein and adapted to have peripheral portions of the plate rest thereon, a bar slidable in said slots having a pair of dies adapted to cooperate with the anvils to punch peripheral notches in the plates, and a center stud on the base adapted for insertion in a central hole in one of the plates to center the reel with relation to the dies.

9. A punch for cutting peripheral notches in plates of a film reel, comprising a support, a pair of anvils on the support having slots therein and adapted to have peripheral portions of the plate rest thereon, a bar slidable in said slots having a pair of dies thereon adapted to cooperate with the anvils to punch peripheral notches in the plates, said support having a plurality of holes therein, and a center stud for application to one of the holes selected according to the diameter of the reel to be punched, said stud being adapted for insertion into a central hole of one of the reel plates.

ARTHUR C. HAYDEN.